United States Patent
Shen et al.

(10) Patent No.: US 7,050,934 B1
(45) Date of Patent: May 23, 2006

(54) METHOD OF WEIGHTED COMBINATION SPECS FOR ENHANCED MANUFACTURING YIELD

(75) Inventors: Yong Shen, Saratoga, CA (US); Jing Zhang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/997,173

(22) Filed: Nov. 24, 2004

(51) Int. Cl.
    *G06F 11/30* (2006.01)
(52) U.S. Cl. .................. 702/179; 702/182; 702/33; 702/34; 702/81; 702/84; 714/33; 714/47; 714/48; 716/4
(58) Field of Classification Search ............ None
    See application file for complete search history.

(56) References Cited

U.S. PATENT DOCUMENTS

| | | | | |
|---|---|---|---|---|
| 5,031,124 A | * | 7/1991 | Bosinoff et al. | 702/186 |
| 5,682,780 A | * | 11/1997 | Girard | 72/16.2 |
| 5,687,597 A | * | 11/1997 | Girard | 72/21.4 |
| 5,832,763 A | * | 11/1998 | Girard | 72/16.3 |
| 5,832,764 A | * | 11/1998 | Girard | 72/16.3 |
| 5,903,460 A | * | 5/1999 | Syouji et al. | 700/117 |
| 5,978,751 A | * | 11/1999 | Pence et al. | 702/179 |
| 6,243,350 B1 | * | 6/2001 | Knight et al. | 369/126 |
| 6,947,871 B1 | * | 9/2005 | Deng et al. | 702/182 |
| 2005/0174665 A1 | * | 8/2005 | Zhang et al. | 360/25 |
| 2005/0257178 A1 | * | 11/2005 | Daems et al. | 716/2 |

* cited by examiner

*Primary Examiner*—Carol S. W. Tsai
(74) *Attorney, Agent, or Firm*—Townsend and Townsend and Crew LLP

(57) ABSTRACT

Embodiments of the invention provide methods for enhancing the downstream product yield without significantly affecting the yield of components from which downstream products are made or enhancing yield of the components without significantly affecting the downstream product yield and performance. In one embodiment, a method comprises obtaining a failure rate of the downstream manufacturing process as a function of each of a plurality of component performance parameters of the current manufacturing process of the component; optimizing weighted factors based on correlation between the current manufacturing process of the component and the downstream product, the weight factors each corresponding to one of the plurality of component performance parameters; and calculating figure of merits (FOM) with respect to the plurality of component performance parameters of the current manufacturing process of the component, the FOM including the weighted factors.

23 Claims, 7 Drawing Sheets

FIG. 2

Downstream Product Data | Component Data
| HDD P/F | parm. X$_1$ | parm. X$_2$ | ......... | parm. X$_{n-1}$ | parm. X$_n$ |
|---|---|---|---|---|---|
| Pass=1 / Fail=0 | 3.058 | 0.2417 | ......... | 81.72 | 15.75 |
| Pass=1 / Fail=0 | 3.079 | 0.2274 | ......... | 88.29 | 16.37 |
| . | . | . | ......... | . | . |
| . | . | . | ......... | . | . |
| . | . | . | ......... | . | . |
| Pass=1 / Fail=0 | 2.946 | 0.2346 | ......... | 94.39 | 13.20 |
| Pass=1 / Fail=0 | 3.047 | 0.2233 | ......... | 87.74 | 16.74 |

FIG. 3

| HDD P/F | log[1-FR(x$_1$)] | log[1-FR(x$_2$)] | ......... | log[1-FR(x$_{n-1}$)] | log[1-FR(x$_n$)] |
|---|---|---|---|---|---|
| Pass=1 / Fail=0 | 0.667 | 0.149 | ......... | 0.420 | 0.129 |
| Pass=1 / Fail=0 | 0.701 | 0.428 | ......... | 0.005 | 0.337 |
| . | . | . | ......... | . | . |
| . | . | . | ......... | . | . |
| . | . | . | ......... | . | . |
| Pass=1 / Fail=0 | 0.120 | 0.756 | ......... | 0.449 | 0.957 |
| Pass=1 / Fail=0 | 0.384 | 0.800 | ......... | 0.033 | 0.058 |

METHOD OF WEIGHTED COMBINATION SPECS FOR ENHANCED MANUFACTURING YIELD

CROSS-REFERENCES TO RELATED APPLICATIONS NOT APPLICABLE

BACKGROUND OF THE INVENTION

This invention relates generally to manufacturing processes and, more particularly, to improving the manufacturing yield using weighted combination specs.

Improving the manufacturing yield has obvious economic benefits. In the context of recording devices such as magnetic hard disk drive apparatuses, HGA (Head Gimbal Assembly) disposition in DET (Dynamic Electrical Testing) is performed mostly via wall specs of individual test parameters. To ensure outgoing HGA quality and HDD (hard disk drive as downstream product with multiple HGAs) yield, it is necessary to have a tight wall spec of individual test parameters using this approach, which leads to lower HGA component yield.

Efforts have been made to look into combining more than one DET parameters. There is, however, no systematic approach to address the interdependence of those spec parameters. As a result, the conventional approach of combining test parameters leads to undesired skew (weight) on some performance parameters over others.

BRIEF SUMMARY OF THE INVENTION

Embodiments of the present invention provide methods for enhancing downstream product yield without significantly affecting yield of components from which downstream products are made or enhancing yield of the components without significantly affecting the downstream product yield and performance. The technique involves using weighted factors to balance the contribution to the yield from individual parameters for the current manufacturing process of a component, and optimizing the weighted factors based on correlation between the current manufacturing process and the downstream products. One example involves a product flow from a wafer to a slider to an HGA to an HDD. The methodology is applied to enhance the downstream HDD product yield without significantly affecting the yield of the HGA component or enhance HGA yield without compromising HDD performance and yield. In another example involving semiconductor manufacturing, the system level testing performance is optimized without significantly sacrificing the chip level testing performance.

One aspect of the present invention is directed to a manufacturing process flow involving a current manufacturing process of a component and a downstream product. A method of enhancing downstream product yield without significantly affecting yield of components from which downstream products are made or enhancing yield of the components without significantly affecting the downstream product yield and performance comprises obtaining a failure rate of the downstream manufacturing process as a function of each of a plurality of component performance parameters of the current manufacturing process of the component; optimizing weighted factors based on correlation between the current manufacturing process of the component and the downstream product, the weight factors each corresponding to one of the plurality of component performance parameters; and calculating figure of merits (FOM) with respect to the plurality of component performance parameters of the current manufacturing process of the component, the FOM including the weighted factors.

In some embodiments, obtaining the failure rate of the downstream product as a function of each of the plurality of component performance parameters of the current manufacturing process of the component comprises obtaining component level test data of the current manufacturing process of the component; obtaining downstream process data of the downstream product; linking the component level test data and the downstream process data using identification numbers; and generating a failure rate curve for a range of each of the component performance parameters.

In specific embodiments, optimizing the weighted factors comprises linearizing the FOM equation:

$$\text{Ln}(FOM) = \sum_{i=1}^{n} \{k_i * \ln[1 - f(x_i)]\}$$

where FOM target for the linear fitting is 1 for Pass and 0 for Fail; wherein $x_i$ is the i-th component performance parameter, $f(x_i)$ is the failure rate of the downstream process for the i-th component performance parameter, and $k_i$ is the weighted factor for the i-th component performance parameter. Optimizing the weighted factors comprises applying a multiple variable linear fitting to the linearized FOM equation to determine the weighted factors. The method may further comprise identifying and omitting one or more component performance parameters which are less important than other component performance parameters. The FOM is calculated as follows:

$$FOM = [1 - f(x_1)]^{k_1} * [1 - f(x_2)]^{k_2} * \ldots * [1 - f(x_n)]^{k_n}.$$

In comparison, in a conventional approach, FOM is represented by an equation without weighted factor $k_i$, or equivalently, all $k_i$'s are set to 1. In the event that two parameters representing the same performance characteristic correlate to each other, undesired skew (weight) is assigned to this performance area.

In some embodiments, $[1-f(x_i)]$ is a downstream product yield per component based on the performance parameter $x_i$, and is determined by using a plurality of look-up plots of the downstream process yield as functions of the performance parameters $x_i$. The look-up plots of the downstream process yield are generated by subtracting from 1 the failure rate of the downstream manufacturing process for each of the plurality of component performance parameters of the current manufacturing process of the component. If the downstream product contains N components, the overall product yield is $[1-f(x_i)]N$. It is clear that the more components a downstream product contain, the lower the overall yield.

In specific embodiments, the failure rate of the downstream product continuously decreases as a function of the FOM with weighted factors. The method may further comprise setting a specification for the FOM based on a downstream yield target for the downstream product. The specification for the FOM is based on the downstream yield target. By definition, FOM covers the contribution of a plurality of component level performance parameters. The method may further comprise relaxing wall spec of individual component performance parameters by balancing contribution to the yield of the downstream product from the component performance parameters.

Another aspect of the present invention relates to a hard disk drive (HDD) manufacturing process flow involving a manufacturing process of a head gimbal assembly (HGA) component with dynamic electrical testing (DET). A method of enhancing HDD yield without significantly affecting HGA yield or enhancing the HGA yield without significantly affecting the HDD yield and performance comprises obtaining a failure rate of the HDD as a function of each of a plurality of DET parameters of the current manufacturing process of the HGA component; optimizing weighted factors based on correlation between the current manufacturing process of the HGA component with the DET parameters and the downstream yield of the HDD, the weight factors each corresponding to one of the plurality of component performance parameters; and calculating figure of merits (FOM) with respect to the plurality of DET parameters, the FOM including the weighted factors.

Another aspect of the invention relates to a computer readable storage medium storing a computer program for enhancing downstream product yield without significantly affecting yield of components from which downstream products are made or enhancing yield of the components without significantly affecting the downstream product yield and performance. The computer program comprises code for obtaining a failure rate of the downstream manufacturing process as a function of each of a plurality of component performance parameters of the current manufacturing process of the component; code for optimizing weighted factors based on correlation between the current manufacturing process of the component and the downstream product, the weight factors each corresponding to one of the plurality of component performance parameters; and code for calculating figure of merits (FOM) with respect to the plurality of component performance parameters of the current manufacturing process of the component, the FOM including the weighted factors. The computer program can be applied to, but not limited to, testing and yield optimization of data storage products and semiconductor devices.

BRIEF DESCRIPTION OF THE DRAWINGS

FIG. 2 is a table showing the HDD Pass/Fail with respect to DET parameters of HGAs in a specific example. Failure rate per HGA in HDD versus a given DET parameter $FR(x_i)$ can be calculated based on this table. $[1-FR(x_i)]$ represents the probability for one HGA to pass in HDD. If a HDD contains N HGAs, $[1-FR(x_i)]N$ represents the probability for all N HGAs to pass in HDD assembly.

FIG. 3 is a table showing the HDD Pass/Fail with respect to $\log[1-FR(x_i)]$. This table is transformed from the table in FIG. 2 based on Failure rate of a HGA in HDD versus a given DET parameter $FR(x_i)$.

DETAILED DESCRIPTION OF THE INVENTION

Figure 1:
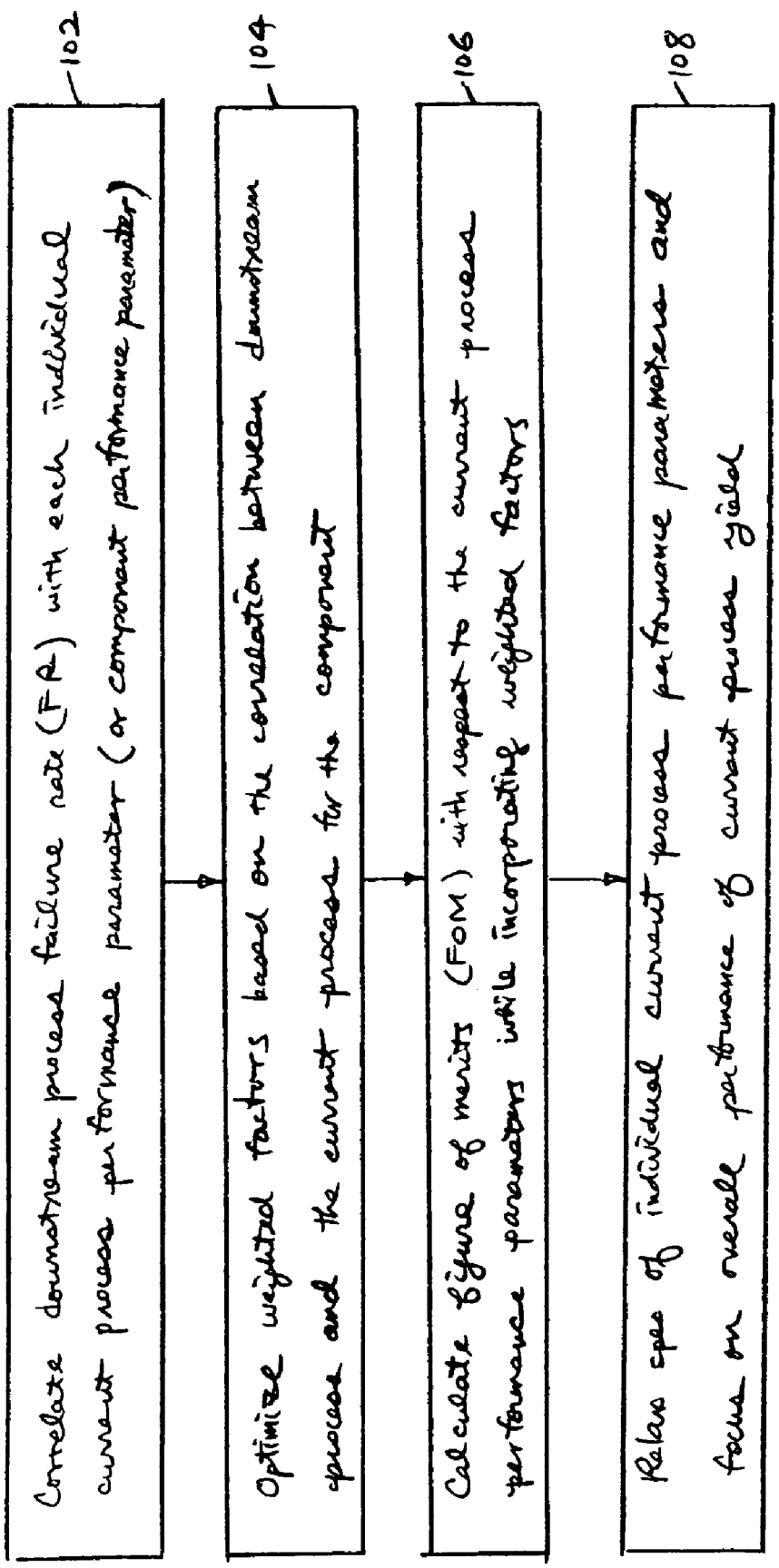
FIG. 1 is a flow diagram illustrating a method of enhancing the manufacturing yield of a downstream process according to an embodiment of the invention.

FIG. 1 shows a flow diagram of a method of enhancing the manufacturing yield of a downstream product with respect to a current manufacturing process of a component according to an embodiment of the invention. For the current manufacturing process of the component, a number of performance parameters will affect the component yield. In the example of the HDD manufacturing process flow, the current manufacturing process may be for the HGA component and the downstream process may be for the HDD product. The initial parameter selection for the HGA manufacturing process may be based on DET methodology (for example, HDD/DET correlation and mechanism of device operation) and tester control (for example, repeatability). Statistical software tools can further fine-tune the parameter selection.

In step 102, the downstream product failure rate $FR(x_i)$ is correlated with each individual current process performance parameter (or component performance parameter). The yield is equal to $(1-FR)$. In the present example, the HDD failure rate is correlated with each individual DET parameter.

In step 104, the weighted factors $k_i$ in the figure of merits (FOM) equation are optimized based on the correlation between the downstream process and the current process (i.e., HDD/DET correlation). In the present embodiment, this involves linearizing the FOM equation and applying the multiple variable least-square linear fitting (without quadratic and cross-terms) or similar techniques:

$$\operatorname{Ln}(FOM) = \sum_{i=1}^{n} \{k_i * \ln[1 - f(x_i)]\}, \quad (1)$$

where the FOM target for the linear fitting is 1 for Pass and 0 for Fail; and where $x_i$ is the i-th current process performance parameter, $f(x_i)$ is the failure rate for the i-th current process performance parameter, and $k_i$ is the weighted factor for the i-th current process performance parameter $x_i$.

The FOM target for the linear fitting is 1 for HDD Pass and 0 for HDD Fail. The multiple variable linear fitting are known and hence will not be described. Based on the weighted factors $k_i$ from the calculation, some of the less important parameters may optionally be omitted while the more important parameters are selected. For example, the DET parameters with the best DET/HDD correlation or the parameters having the highest weighted factors are selected.

In step 106, the FOM incorporating weighted factors is calculated with respect to the plurality of current process performance parameters (i.e., the DET parameters) as follows:

$$FOM = [1 - f(x_1)]^{k_1} * [1 - f(x_2)]^{k_2} * \ldots * [1 - f(x_n)]^{k_n}. \quad (2)$$

In step 108, the spec of the individual current process performance parameters may be relaxed and the focus is placed on the overall performance of the current process yield. In the HDD example, the wall spec of the individual DET parameters for the HGA can be relaxed and the focus is placed on the overall HGA performance with FOM in the HDD manufacturing flow.

Figure 4:
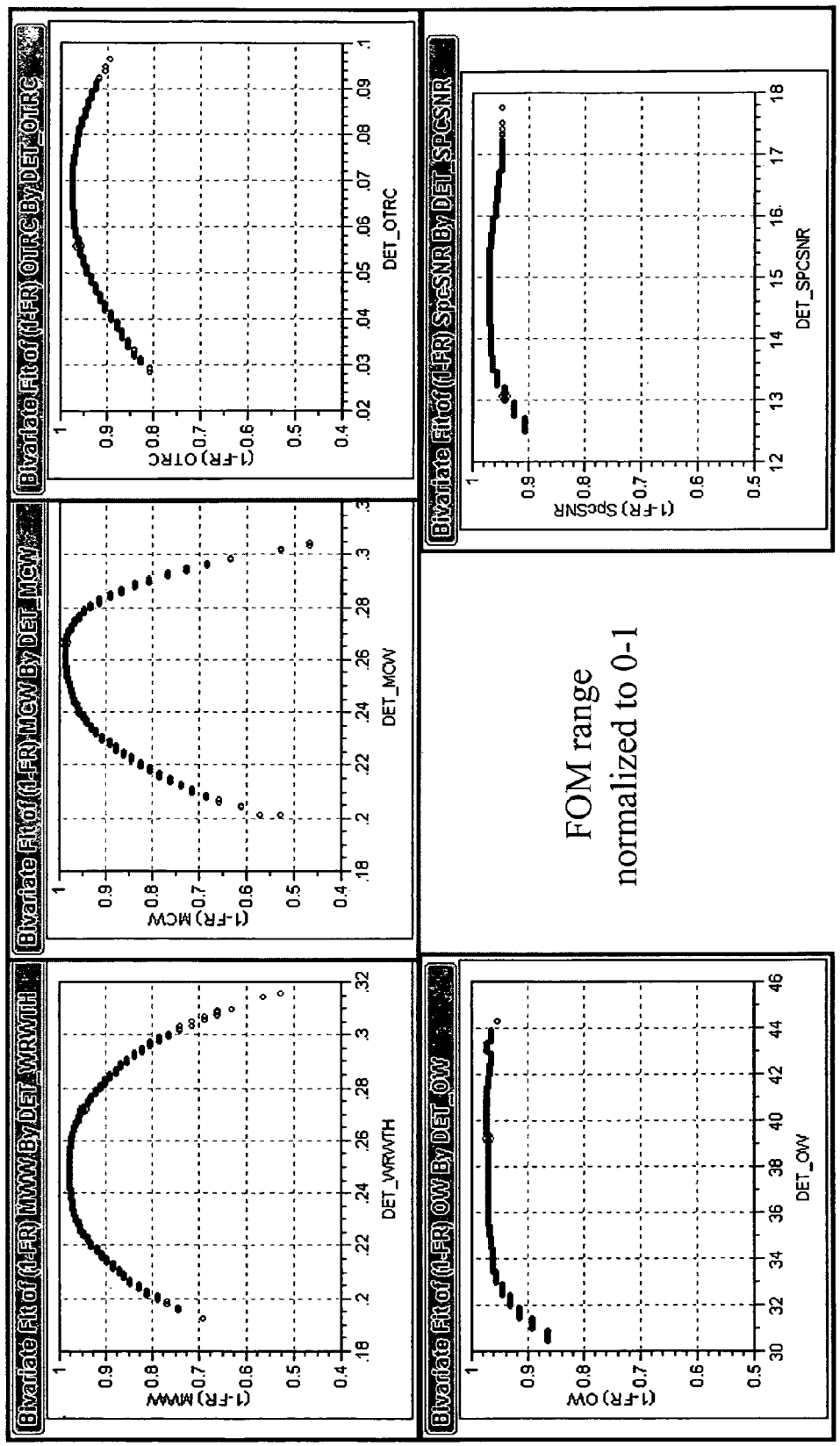
FIG. 4 shows a number of look-up plots for HDD yield per HGA as functions of the DET parameters each over a range of values.

An example involving the HDD manufacturing flow with the HGA component as the current manufacturing process will be described to illustrate the methodology. FIG. 2 shows a table of the HDD yield per HGA expressed as pass/fail (P/F) with respect to DET parameters $x_i$, where pass=1 and fail=0. The table in FIG. 2 is converted to the table in FIG. 3, which shows the HDD yield per HGA with respect to the log of HGA component yield $(1-FR(x_i))$ based on the DET parameters $x_i$. The HGA component yield values $(1-FR(x_i))$ in HDD are obtained from the look-up plots/tables as seen in FIG. 4, which shows a number of look-up plots for HDD yield per HGA as functions of the DET parameters each over a range of values. The HDD P/F values (either 0 or 1) are known. The values in the table of FIG. 3 are used in Equation (2) to run the multi-variable linear fitting to determine the weight factors $k_i$ for optimization.

The look-up plots in FIG. 4 showing HDD yield per HGA as functions of the DET parameters are obtained in step 102 in the methodology presented in FIG. 1. One way to generate the look-up plots is to first obtain the component level test or performance data (i.e., the DET data), and the downstream process data (i.e., the HDD P/F data). The two data sets are linked by identification or serial numbers. Then the failure rate (FR) curves are produced for different component parameters (i.e., DET parameters). The HDD yield (1−FR) look-up plots per HGA of FIG. 4 are generated as functions of the various component parameters each over a range of values.

Figure 5:
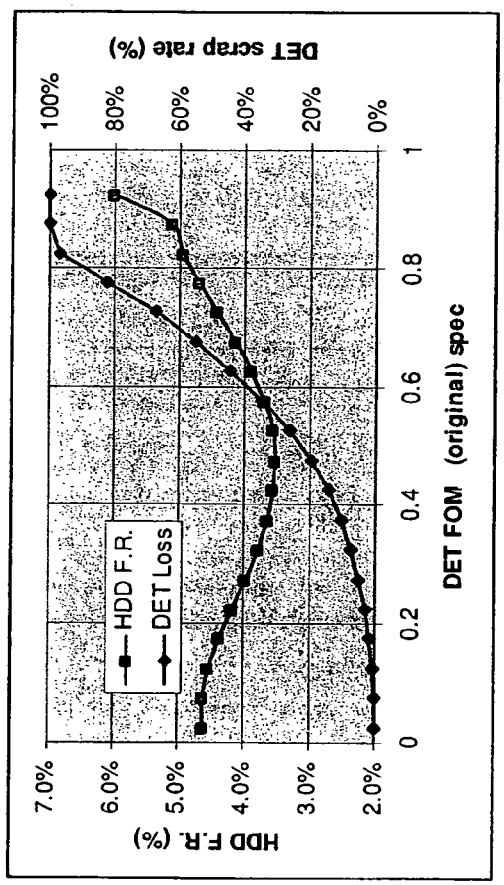
FIG. 5 shows a plot of the HDD failure rate per HGA as a function of the DET FOM spec without weighted factors.
Figure 6:
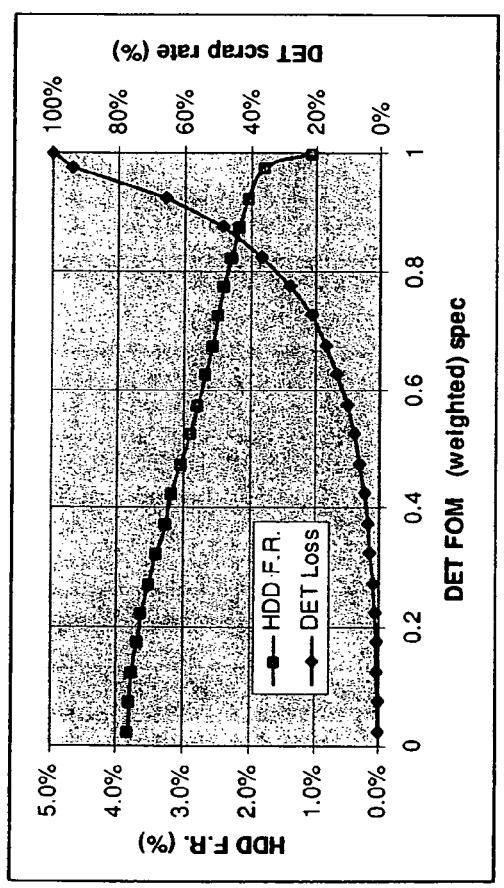
FIG. 6 shows a plot of the HDD failure rate per HGA as a function of the DET FOM spec with weighted factors.

FIG. 5 shows a plot of the HDD failure rate per HGA as a function of the DET FOM spec without weighted factors, while FIG. 6 is a plot of the HDD failure rate per HGA as a function of the DET FOM spec with weighted factors. In FIG. 6, the HDD FR (failure rate) plot continuously decreases as a function of the DET weighted FOM spec, and the DET loss plot continuously increases a function of the DET weighted FOM spec. If a 5% DET scrap rate is acceptable at a DET weighted ROM spec level of about 0.4, the HDD FR per HGA drops from about 3.9% to about 3.2%, which represents a yield gain of about 0.7%. If a 20% DET scrap rate is acceptable at a DET weighted FOM spec level of about 0.7, the HDD FR per HGA drops from about 3.9% to about 2.6%, which represents a yield gain of about 1.3%. In contrast, the HDD FR per HGA plot in FIG. 5 decreases to a minimum level at a DET FOM spec of about 0.48 and then increases to a maximum level at a DET FOM spec of about 0.91. This is the result of the undesired skew (weight) on some performance parameters over others.

Figure 7:
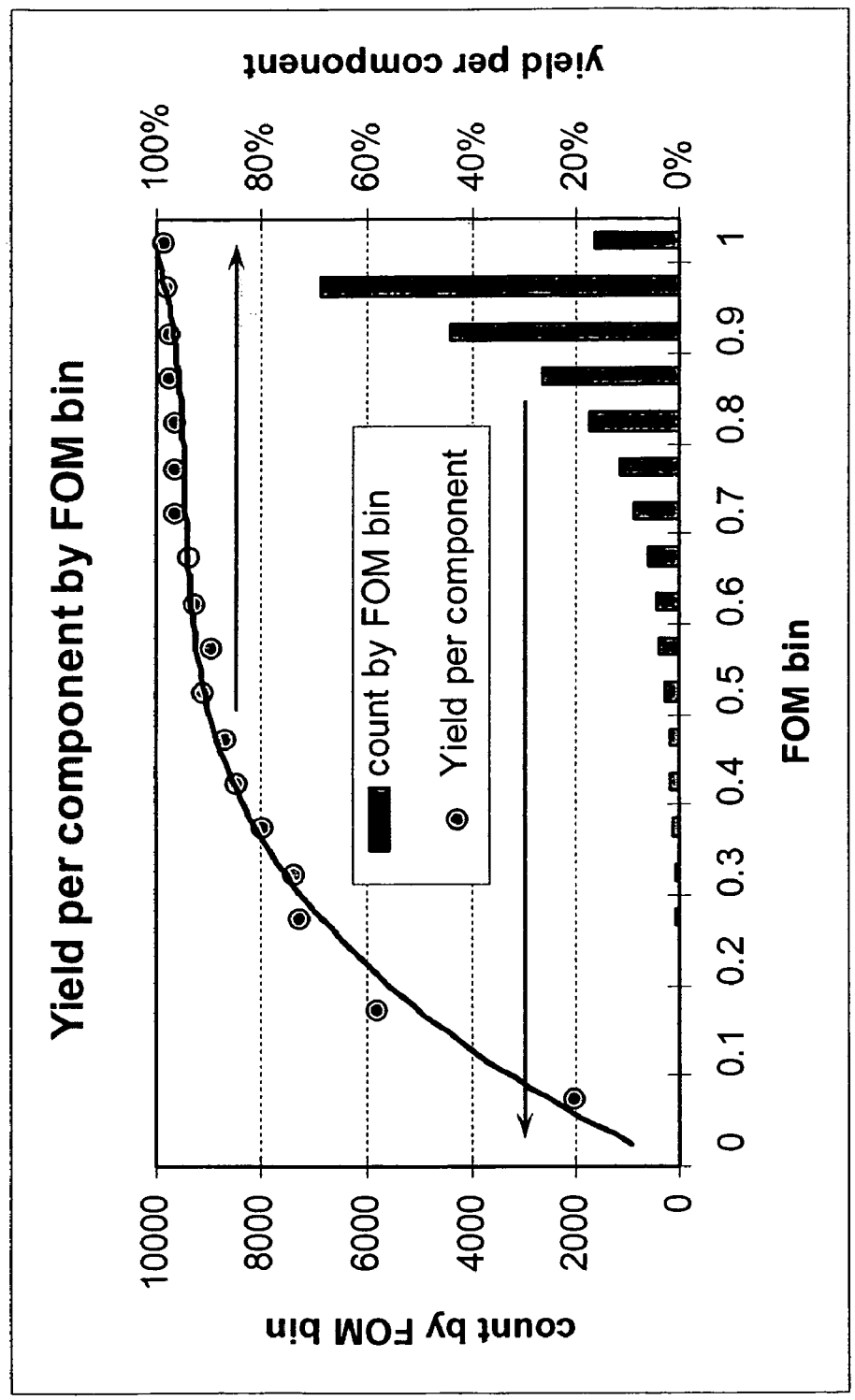
FIG. 7 shows a plot of the HDD yield per HGA as a function of the DET FOM with weighted factors.

FIG. 7 shows a plot of the HDD yield per component as a function of the DET FOM with weighted factors. As discussed above in connection with FIG. 6, the HDD FR continuously decreases as a function of the DET FOM weighted spec. Because the HDD yield is (1−FR), the HDD yield curve continuously increases as a function of the DET weighted FOM spec. It is noted that different raw data sets were used for FIG. 6 and FIG. 7. In FIG. 7, the abscissa shows FOM bins with count by FOM bin plotted in the ordinate as well. The count for each FOM bin represents the number of samples that fall within that FOM bin. Using the HDD yield plot of FIG. 7, one can set the specification for the FOM based on a system yield target (i.e., HDD yield target). For example, if the system yield target is 80%, the plot shows an intersection with the FOM bin at about 0.35. The components (i.e., HGAs) that fall within FOM bins of under 0.35 will be removed or scrapped to achieve the system yield target. It makes more economic sense to scrap a component earlier in the process before reaching higher level assemblies.

Different systems may include different number of components. For example, one HDD may include 6 HGAs and another HDD may include 10 HGAs. FIG. 7 shows a plot of yield per component. The overall yield will be obtained by multiplying the yields of all components in the particular system. For example, overall HDD yield with N HGAs is $[1-FR(x_i)]N$ for i-th DET parameters $x_i$. If an HDD contains 10 HGAs, HDD FR reduction per HGA from 3.9% to 2.6% corresponds to an overall HDD yield improvement from 67% to 77%. Furthermore, to achieve the same system yield target for systems having different numbers of components, the scrap rate for the components will be different and can be determined. The more components a system has, the higher the component scrap rate (with tighter spec) will be to achieve the same system yield target. There is opportunity to bin components by FOM for downstream products with different components counts to maximize the component utilization without compromising overall downstream product yield.

Figure 8:
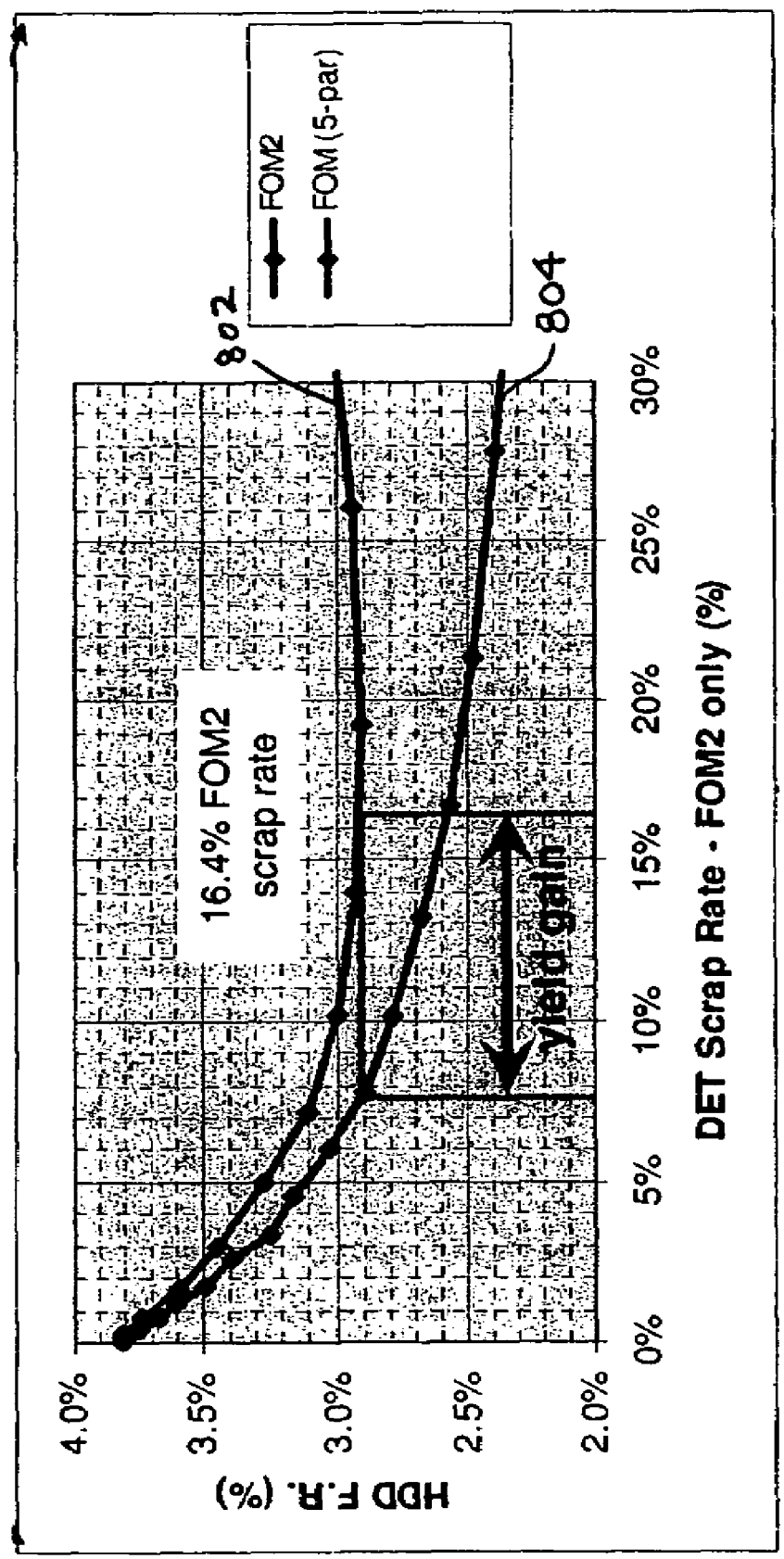
FIG. 8 is a diagram illustrating the DET yield gain as a result of using the DET FOM spec with weighted factors as compared to the DET yield without weighted factors. A constant HDD yield id assumed.

One benefit of using the weighted combination specs is the component yield gain that is achieved for a given system failure rate. FIG. 8 shows a plot of system failure rate (i.e., HDD FR) as a function of the component scrap rate (i.e., DET scrap rate). The first curve 802 is obtained by conventional FOM without weighted factors. The second curve 804 is obtained using the weighted combination specs. Using the DET FOM spec with weighted factors eliminates the undesired skew (weight) on some performance parameters over others, and results in a yield gain. As shown in FIG. 8, at the HDD FR of 2.9%, the DET scrap rate in the conventional curve 802 is about 16.5% and the DET scrap rate in the weighted combination specs curve 804 is about 7.7%. This represents a component (i.e., DET) yield gain of about 8.8% (i.e., lower DET scrap rate).

Figure 9:
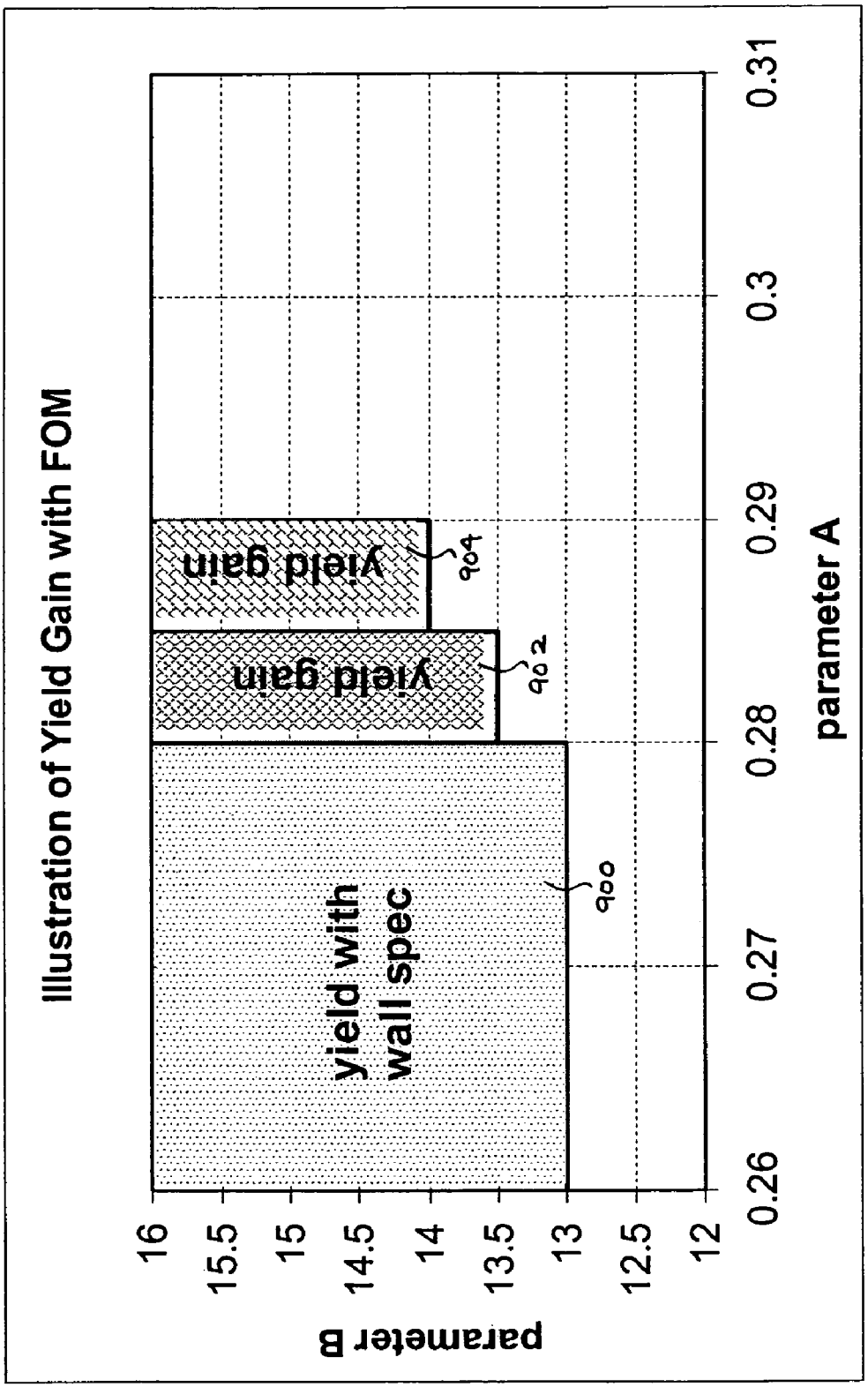
FIG. 9 is a diagram schematically illustrating the component yield gain beyond the yield with wall spec as a result of using the DET FOM spec with weighted factors.

Another feature of using the weighted combination specs is the system yield gain that can be achieved by balancing the contribution from various parameters. FIG. 9 is a diagram schematically illustrating the HGA yield gain beyond the yield with wall spec 900 as a result of using the DET FOM spec with weighted factors. The yield with wall spec 900 is obtained based on data obtained for individual parameters A and B without consideration of the interdependency between those parameters. The upper bound for parameter A is 0.28 and the lower bound for parameter B is 13 for the yield with wall spec 900. Because the FOM spec with weighted factors balances the contribution from individual parameters, if parameter B has more performance margin, then the spec for parameter A can be effectively relaxed through the FOM. FIG. 9 shows a yield gain region 904 at B>13.5 at which parameter A is relaxed to A<0.285, and another yield gain region 906 at B>14 at which parameter A is relaxed to A<0.29.

The yield enhancement scheme described above may be implemented in software or firmware and stored in a computer readable medium such as a memory or any suitable storage area. The computer program is executed by a computer processor to carry out the various process steps of manipulating data, optimizing factors, generating curves, setting specifications, and the like. In one embodiment, a computer readable storage medium stores a computer program for enhancing downstream product yield without significantly affecting yield of components from which downstream products are made or enhancing yield of the components without significantly affecting the downstream product yield and performance. The computer program comprises code for obtaining a failure rate of the downstream manufacturing process as a function of each of a plurality of component performance parameters of the current manufacturing process of the component; code for optimizing weighted factors based on correlation between the current manufacturing process of the component and the downstream product, the weight factors each corresponding to one of the plurality of component performance parameters; and code for calculating figure of merits (FOM) with respect to the plurality of component performance parameters of the current manufacturing process of the component, the FOM including the weighted factors. The computer program can be applied to, but not limited to, testing and yield optimization of data storage products and semiconductor devices.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. In a manufacturing process flow involving a current manufacturing process of a component and a downstream product containing multiple components of the same kind, a method of enhancing downstream product yield without significantly affecting yield of components from which downstream products are made or enhancing yield of the components without significantly affecting the downstream product yield and performance, the method comprising:
    obtaining a failure rate of the downstream manufacturing process as a function of each of a plurality of component performance parameters of the current manufacturing process of the component;
    optimizing weighted factors in a figure of merits (FOM) equation based on correlation between the current manufacturing process of the component and the downstream manufacturing process, the weighted factors each corresponding to one of the plurality of component performance parameters; and
    calculating the figure of merits (FOM) with respect to the plurality of component performance parameters of the current manufacturing process of the component, the FOM including the weighted factors.

2. The method of claim 1 wherein obtaining the failure rate of the downstream product as a function of each of the plurality of component performance parameters of the current manufacturing process of the component comprises:
    obtaining component level test data of the current manufacturing process of the component;
    obtaining downstream process data of the downstream product;
    linking the component level test data and the downstream process data using identification numbers; and
    generating a failure rate curve for a range of each of the component performance parameters.

3. The method of claim 1 wherein optimizing the weighted factors comprises linearizing the FOM equation:

$$\text{Ln}(FOM) = \sum_{i=1}^{n} \{k_i * \ln[1 - f(x_i)]\}$$

where the FOM target for the linear fitting is 1 for Pass and 0 for Fail; and where $x_i$ is the i-th component performance parameter, $f(x_i)$ is the failure rate of the downstream process for the i-th component performance parameter, and $k_i$ is the weighted factor for the i-th component performance parameter.

4. The method of claim 3 wherein the FOM is calculated as follows:

$$FOM = [1 - f(x_1)]^{k_1} * [1 - f(x_2)]^{k_2} * \ldots * [1 - f(x_n)]^{k_n}.$$

5. The method of claim 4 wherein optimizing the weighted factors comprises applying a multiple variable linear fitting to the linearized FOM equation to determine the weighted factors.

6. The method of claim 5 further comprising identifying and omitting one or more component performance parameters which are less important than other component performance parameters.

7. The method of claim 3 wherein $[1-f(x_i)]$ is a downstream process yield per component based on the performance parameter $x_i$, and is determined by using a plurality of look-up plots of the downstream process yield as functions of the performance parameters $X_i$.

8. The method of claim 7 wherein the look-up plots of the downstream process yield per component are generated by subtracting from 1 the failure rate of the downstream manufacturing process for each of the plurality of component performance parameters of the current manufacturing process of the component.

9. The method of claim 1 wherein the failure rate of the downstream product per component continuously decreases as a function of the FOM with weighted factors.

10. The method of claim 9 further comprising setting a specification for the FOM based on a downstream yield target for the downstream product.

11. The method of claim 1 further comprising relaxing wall spec of individual component performance parameters by balancing contribution to the yield of the downstream process from the component performance parameters.

12. In a hard disk drive (HDD) manufacturing process flow involving a manufacturing process of a head gimbal assembly (HGA) component with dynamic electrical testing (DET), a method of enhancing HDD yield without significantly affecting HGA yield or enhancing the HGA yield without significantly affecting the HDD yield and performance, the method comprising:
    obtaining a failure rate of the HDD as a function of each of a plurality of DET parameters of the current manufacturing process of the HGA component;
    optimizing weighted factors in a figure of merits (FOM) equation based on correlation between the current manufacturing process of the HGA component with the DET parameters and the downstream yield of the HDD, the weighted factors each corresponding to one of the plurality of DET parameters; and calculating the figure of merits (FOM) with respect to the plurality of DET parameters, the FOM including the weighted factors.

13. The method of claim 12 wherein optimizing the weighted factors comprises linearizing the FOM equation:

$$\text{Ln}(FOM) = \sum_{i=1}^{n} \{k_i * \ln[1 - f(x_i)]\},$$

where the FOM target for the linear fitting is 1 for Pass and 0 for Fail; and where $x_i$ is the i-th DET parameter, $f(x_i)$ is the failure rate of the downstream process for the i-th DET parameter, and $k_i$ is the weighted factor for the i-th DET parameter.

14. The method of claim 13 wherein the FOM is calculated as follows:

$$FOM = [1 - f(x_1)]^{k_1} * [1 - f(x_2)]^{k_2} * \ldots * [1 - f(x_n)]^{k_n}.$$

15. The method of claim 14 wherein optimizing the weighted factors comprises applying a multiple variable linear fitting to the linearized FOM equation to determine the weighted factors.

16. A computer readable storage medium storing a computer program for enhancing downstream product yield without significantly affecting yield of components from which downstream products are made or enhancing yield of the components without significantly affecting the downstream product yield and performance, the computer program comprising:
- code for obtaining a failure rate of the downstream manufacturing process as a function of each of a plurality of component performance parameters of the current manufacturing process of the component;
- code for optimizing weighted factors in a figure of merits (FOM) equation based on correlation between the current manufacturing process of the component and the downstream manufacturing process, the weighted factors each corresponding to one of the plurality of component performance parameters; and
- code for calculating the figure of merits (FOM) with respect to the plurality of component performance parameters of the current manufacturing process of the component, the FOM including the weighted factors.

17. The computer readable storage medium of claim 16 wherein the code for obtaining the failure rate of the downstream product as a function of each of the plurality of component performance parameters of the current manufacturing process of the component comprises:

- code for obtaining component level test data of the current manufacturing process of the component;
- code for obtaining downstream process data of the downstream manufacturing process;
- code for linking the component level test data and the downstream process data using identification numbers; and
- code for generating a failure rate curve for a range of each of the component performance parameters.

18. The computer readable storage medium of claim 16 wherein the code for optimizing the weighted factors comprises code for linearizing the FOM equation:

$$\text{Ln}(FOM) = \sum_{i=1}^{n} \{k_i * \ln[1 - f(x_i)]\}$$

where the FOM target for the linear fitting is 1 for Pass and 0 for Fail; and where $x_i$ is the i-th component performance parameter, $f(x_i)$ is the failure rate of the downstream process for the i-th component performance parameter, and $k_i$ is the weighted factor for the i-th component performance parameter.

19. The computer readable storage medium of claim 18 wherein the FOM is calculated as follows:

$$FOM = [1 - f(x_1)]^{k_1} * [1 - f(x_2)]^{k_2} * \ldots * [1 - f(x_n)]^{k_n}.$$

20. The computer readable storage medium of claim 19 wherein the code for optimizing the weighted factors comprises code for applying a multiple variable linear fitting to the linearized FOM equation to determine the weighted factors.

21. The computer readable storage medium of claim 16 further comprising code for relaxing wall spec of individual component performance parameters by balancing contribution to the yield of the downstream process from the component performance parameters.

22. The computer readable storage medium of claim 16 further comprising code for selecting most significant component performance parameters.

23. The computer readable storage medium of claim 16 wherein the computer program is implemented in firmware or software and the downstream products include data storage products or semiconductor devices.

* * * * *